(12) United States Patent
Sackett

(10) Patent No.: US 6,385,132 B1
(45) Date of Patent: May 7, 2002

(54) SEISMIC SENSOR SHROUD PACKAGE

(75) Inventor: James A. Sackett, Houston, TX (US)

(73) Assignee: Sercel, U.S. Inc., Houston, TX (US)

( * ) Notice: Subject to any disclaimer, the term of this patent is extended or adjusted under 35 U.S.C. 154(b) by 0 days.

(21) Appl. No.: 09/584,505

(22) Filed: May 31, 2000

(51) Int. Cl.[7] ............................ H04R 11/00; G01V 1/16
(52) U.S. Cl. ........................ 367/188; 367/106; 367/130; 367/177
(58) Field of Search ..................... 367/20, 106, 130, 367/153, 154, 188, 177; 114/253; 174/101.5; 439/624

(56) References Cited

U.S. PATENT DOCUMENTS 5,341,348 A * 8/1994 Farris .......................... 367/177
5,529,011 A * 6/1996 Williams, Jr. ................ 114/245
5,742,562 A * 4/1998 Marschall et al. ........... 367/188

* cited by examiner

*Primary Examiner*—Ian J. Lobo
(74) *Attorney, Agent, or Firm*—Howrey Simon Arnold & White, LLP

(57) ABSTRACT

A method of and an apparatus for mounting seismic vibration sensors to a cable designed for use offshore, such that the sensors are optimally coupled to the ocean floor through all cylindrical rotations when the cable has reached the bottom after being slipped over the transom of a deployment vessel. Said coupling is accomplished without the use of a sub-surface robotic vessel to force the sensors into a particular orientation. The housing for the sensors is adapted to endure and minimize the impact on the host cable of the mechanical extremes the system is subjected to in the process of the conventional deployment and retrieval methods.

32 Claims, 11 Drawing Sheets

SEISMIC SENSOR SHROUD PACKAGE

BACKGROUND OF THE INVENTION

In the seismic exploration industry, it is useful to have a plurality of sensors to transform mechanical earth movement into electrical signals capable of further analysis. These sensors include vertically oriented vibration sensors, called vertical geophones, horizontally oriented vibration sensors, called horizontal geophones, and differential-pressure sensors, called hydrophones. These sensors are used to detect sound waves that are bounced off reflecting sub-strata in a manner well known in the art, and as they detect different aspects of the reflected sound wave it is sometimes useful to use them in conjunction. The method of deploying the cable-sensor system typically leaves the orientation of the sensor packages indeterminate, so it is necessary to insure that any orientation requirement of the internal sensors be otherwise accommodated. Hydrophones as pressure devices are intrinsically not position sensitive. However, the geophones are gravity dependent. Therefore they are typically gimbal-mounted to insure the vertical and horizontal geophones are truly properly oriented relative to the earth. Due to the depths and electrical nature of the geophones, the gimbal-mounted geophone(s) are contained in a protective pressure housing. These sensor packages, which may typically contain a hydrophone, two horizontal geophones, and one vertical geophone tend to be relatively large and massive compared to the cross-section of the host cable used to transmit the data back to the recording vessel.

Previous methods of mounting sensor packages to ocean bottom cables have focused on protecting the sensor package from the deployment and retrieval hardware. They have ranged in complexity from simply taping the sensors to the cable, to using large adhesive-lined heatshrink tubing to completely cover the package and its section of the host cable, to specialized molded parts enclosing the sensor package that would attach to the main cable with steel bands. Each method had its advantages and disadvantages, but all shared a fundamental shortcoming. The sensor package is mounted sidesaddle on the main cable, with the result that the mechanical coupling of the sensors to the ocean floor depended on the rotation of the cable at the sensors location. All rotations of the sensor where the sensor is not in direct contact with the seafloor, other than directly above the cable, result in all vibrations being transmitted through the effective torsional spring of the main cable. This adds an additional frequency dependent transfer function to the sensor's data, with the specific transfer function varying from location to location. Also note that these orientations would be a noise source were they to start oscillatory vibration due to any water currents or wave movement.

A remedy for this problem is to emplace the sensor package's cylindrical axis coaxial to the cable's axis, thereby removing any possibility of spring-mass interaction. The difficulty with doing this is that this method requires the cable's axial strength member to be severed to create room, and the surrounding electrical wires bird-caged around the sensor. This method weakens the cable unless extraordinary steps are taken in the sensor to carry the tensile load, and if a method can be implemented to carry the tension it is very expensive and labor intensive to produce.

The present invention addresses the need for the sensor package's coupling to be rotation orientation independent while maintaining the integrity of the host cable, and rugged enough to survive the typical rigors of the average set of cable handling equipment. It also is easy to implement so as to reduce the construction labor costs.

A sensor housing shroud for mounting seismic sensors to a cable is provided which comprises a pair of spaced apart endshot anchor cores bonded to the jacket of the cable, an overmold endshot anchor bonded to each anchor core, an organizer coaxially aligned with and attached about the cable for holding the seismic sensors and their balance rods, an end piece attached about each overmold endshot anchor, and a substantially cylindrically symmetrical outer shell enclosing the organizer and coupled to the end pieces, wherein the housing shroud has a substantially balanced rotational moment. The organizer may be further adapted to hold balance rods, pingers, and/or other seismic oceanographic sensors and their associated balance masses. The end pieces may be attached to flat surfaces on the respective overmold endshot anchors. The sensor housing shroud may include an organizer clamp for securing components to the organizer. In a preferred embodiment, the anchor cores and anchors are made of the same plastic material as the cable jacket and are chemically bonded together to form a monolithic structure. The shell for the sensor housing shroud may be constructed of removable pieces held together by one or more banding straps. The shell preferably is composed of hermaphroditic pieces and uses a tenon and mortise arrangement. The center line of the sensor housing shroud is substantially the same as the center line of the cable. Preferably, each mass held in the organizer is substantially balanced by an offsetting mass radially opposite the cylindrical axis of the cable.

In another embodiment of the invention, a seismic sensor shroud package having a substantially balanced rotational moment is provided which comprises a pair of spaced apart endshot anchor cores bonded to the jacket of a seismic cable, an overmold endshot anchor bonded to each anchor core, a tapered end piece attached about each overmold endshot anchor, a four component seismic sensor attached to an organizer, the organizer being coaxially aligned with and attached about the cable, and a substantially cylindrically symmetrical outer shell coupled to the end pieces and enclosing the seismic sensor, wherein the cylindrical axis of the seismic sensor shroud package is coaxial to the axis of the cable. The seismic sensors for the sensor housing shroud or seismic sensor shroud package described above may comprise a combination of gimbal mounted velocity sensors, oriented to one or more of the three axes, and may also include one or more pressure sensors.

BRIEF DESCRIPTION OF THE DRAWINGS

Other objects and advantages of the invention will become apparent upon reading the following detailed description and upon reference to the drawings in which.

Figure 1:
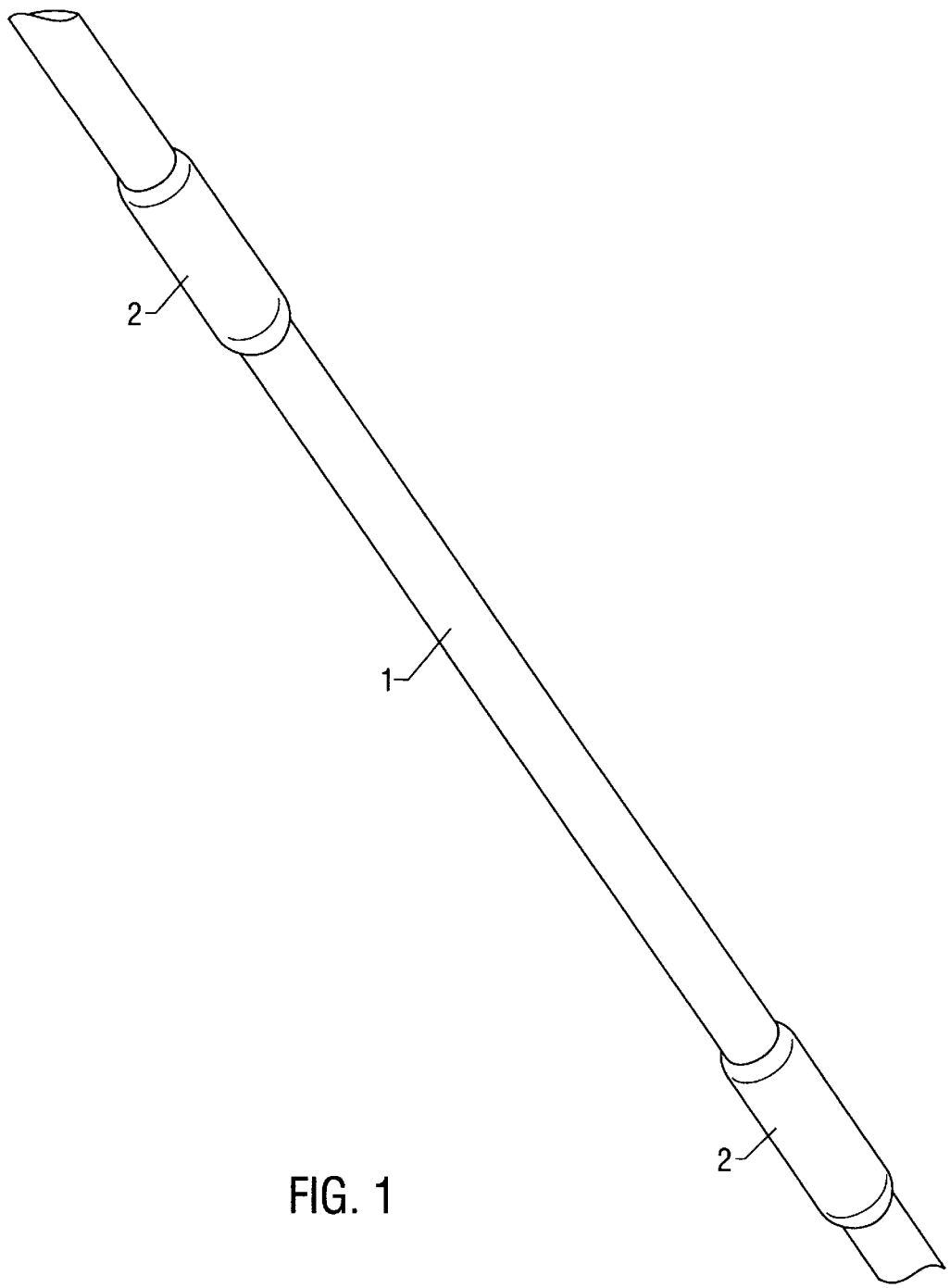
FIG. 1 illustrates a pair of spaced apart endshot anchor cores bonded to the jacket of a seismic cable.

While the present invention has been particularly shown and described with reference to various illustrative embodiments thereof, it will be understood by those skilled in the art that various changes in form and details may be made without departing from the spirit and scope of the invention. The above-described embodiments are illustrative and should not be considered as limiting the scope of the present invention.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The invention is based on substantially balancing the rotational moments of the system so that any residual torsional-spring-mass frequency transfer function impact is minimal. This is accomplished using a central "organizer" to hold and orient the sensor package, one or more balance rods, and any additional weights, sensor, or connector packages and their associated balancing masses. Each mass is substantially balanced by one or more offsetting masses radially opposite the cylindrical axis of the host cable. Since the activating energy (earth movement, wave motion) is lateral and thereby acts equally on the balanced masses, the resulting balance of the mass-moment arm products does not yield a mechanism that produces a torsional motion.

This core may then be surrounded by a tough, substantially cylindrically symmetrical shell; tough to protect the sensor and cylindrical to allow the coupling to be orientation independent. The shell may be slightly flexible to allow it to more easily transverse the sheaves and other bending paths typical of offshore cable handling equipment. The shell may have protrusions and thus need not be absolutely cylindrical, as long as the protrusions are substantially mass moment-arm balanced. Such protrusions are common on sensor packages to aid the package to settle into soft bottoms and resist wave or water current forces.

In the event of a sensor failure, it is desirable to be able to effect field repairs by exchanging sensor modules. Accordingly, an aspect of certain embodiments of the present invention is to construct the shell in pieces that may be removed and replaced after internal repairs are complete. Each major piece may be hermaphroditic in nature to minimize inventory and reduce the possibility of misapplying the parts. The component parts essentially snap together and are held in place with steel bands, or the like.

The retrieval method common to this usage involves pulling the cable through opposing sets of powered wheels, such as ATV tires. Thus, all the retrieval forces are shear-forces on the outside of the cable and its appendages, as opposed to centralized tension-forces more common to cables retrieved onto a reel, and any appendage such as the present invention must withstand these shear forces. Multiple sets of wheels divide the total tension load, but due to tire slippage on the host cable it is possible for any given appendage to be subjected to tensile loads as high as the full load on the cable. Accordingly, an aspect of one embodiment of the present invention is to couple all components- the outer shell halves, the two sets of end-piece halves, and the host cable overmolds- into a mechanically robust framework that will withstand tensile loads up to the breaking strength of a typical host cable. The outer shell halves may be coupled to the two sets of end-piece halves using a tenon and mortise arrangement, held together with simple banding straps. The two sets of end-piece halves and the endshot anchors overmolded onto the host cable may be coupled similarly. Preferably, the two sets of endshot anchor cores and anchors and the host cable jacket are intrinsically chemically bonded, since the anchor cores, anchors and the jacket are made of the same basic plastic material such as polyurethane and bond together during the molding process.

The retrieval method common to this usage involves pulling the cable through opposing sets of powered wheels, such as ATV tires. The tires and support mechanisms adapt to the changing sizes between the host cable and any given appendage, but cannot do so instantaneously. Any sudden change in size on the cable assembly, that occurs more rapidly than the retrieval equipment's reaction capability, results in tension spikes on the cable assembly. Accordingly, another aspect of one embodiment of the present invention is for the transition between the subject invention and the host cable to be gently tapered relative to the diameter of common retrieval tire sizes, to facilitate the retrieval mechanism to adapt to the change in diameter from host cable to the present invention back to the host cable.

The retrieval method common to this usage involves pulling the cable, over sheaves at high tension and through various pathways on board the ship at lower tensions, that would require all cable mounted hardware to withstand the bending forces and localized pressure point loadings associated with the bending path. Accordingly, an aspect of certain embodiments of the present invention is to insure that all the component parts are sufficiently robust to withstand such forces.

The wiring from the sensor into the host cable could be sheared off if the cylindrical sensor-housing package is allowed to rotate on the cable axis. Accordingly, another aspect of one embodiment of the present invention is to incorporate anti-rotation flats into the different subassemblies.

Figure 2:
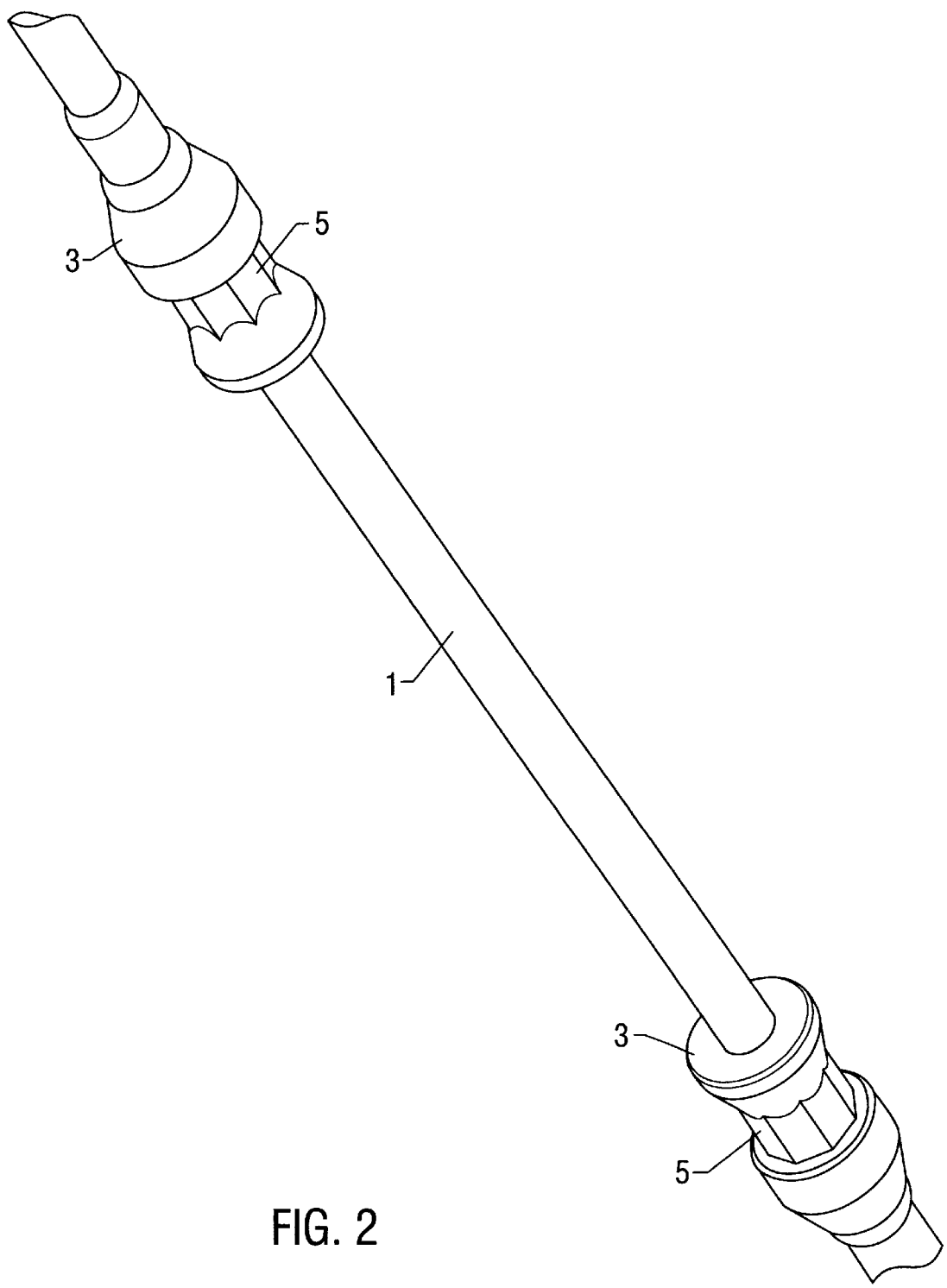
FIG. 2 illustrates the overmold endshot anchors bonded to the anchor cores.

FIGS. 1–9 illustrate the construction of a preferred embodiment of the invention. A pair of spaced apart endshot anchor cores 2 are bonded to the jacket of seismic cable 1. An overmold endshot anchor 3 is bonded to each anchor core 2 as shown in FIG. 2. Preferably, the endshot anchor cores 2 are relatively thin so heat does not damage the cable components during the molding process. The molding process is conducted at high temperature and pressures to obtain a good chemical bond between the anchor cores and the jacket of cable 1. The anchor cores act as insulation to the cable and protect the cable during the second overmolding process. The relatively thicker endshot anchors will melt the surface of and adhere to the anchor cores during the second molding process to create a monolithic structure. Preferably, the cable jacket and the anchor cores and anchors are made of the same plastic material. In a preferred embodiment, the cable jacket, anchor cores and anchors are made of polyurethane. The monolithic structure created by the overmolding process will transmit tensile forces from the shroud to the internal stress core of the cable and the kevlar braiding of the cable jacket. Those skilled in the art will appreciate that other pliable materials may be used for some or all of the components of the invention.

The endshot anchors may include a plurality of aligned flat surfaces 5. The embodiment illustrated in FIG. 2 includes octagonal surfaces. Flat surfaces 5 provide an anti-rotation foundation for end pieces 15. The endshot anchors 3 also serve as two anchor points for orienting the sensor package. The sensors are connected to the cable wire by splicing wires from the cable with wiring from the sensors (not shown). The location where the splicing occurs is commonly known as the takeout, which can be either inside or outside the sensor housing shroud. Because the sensors are connected to the cable wire by splicing, it is imperative to keep the sensors from spinning relative to the cable jacket. The endshot anchors serve as anchors points and keep the shroud from moving relative to the cable jacket.

Figure 3:
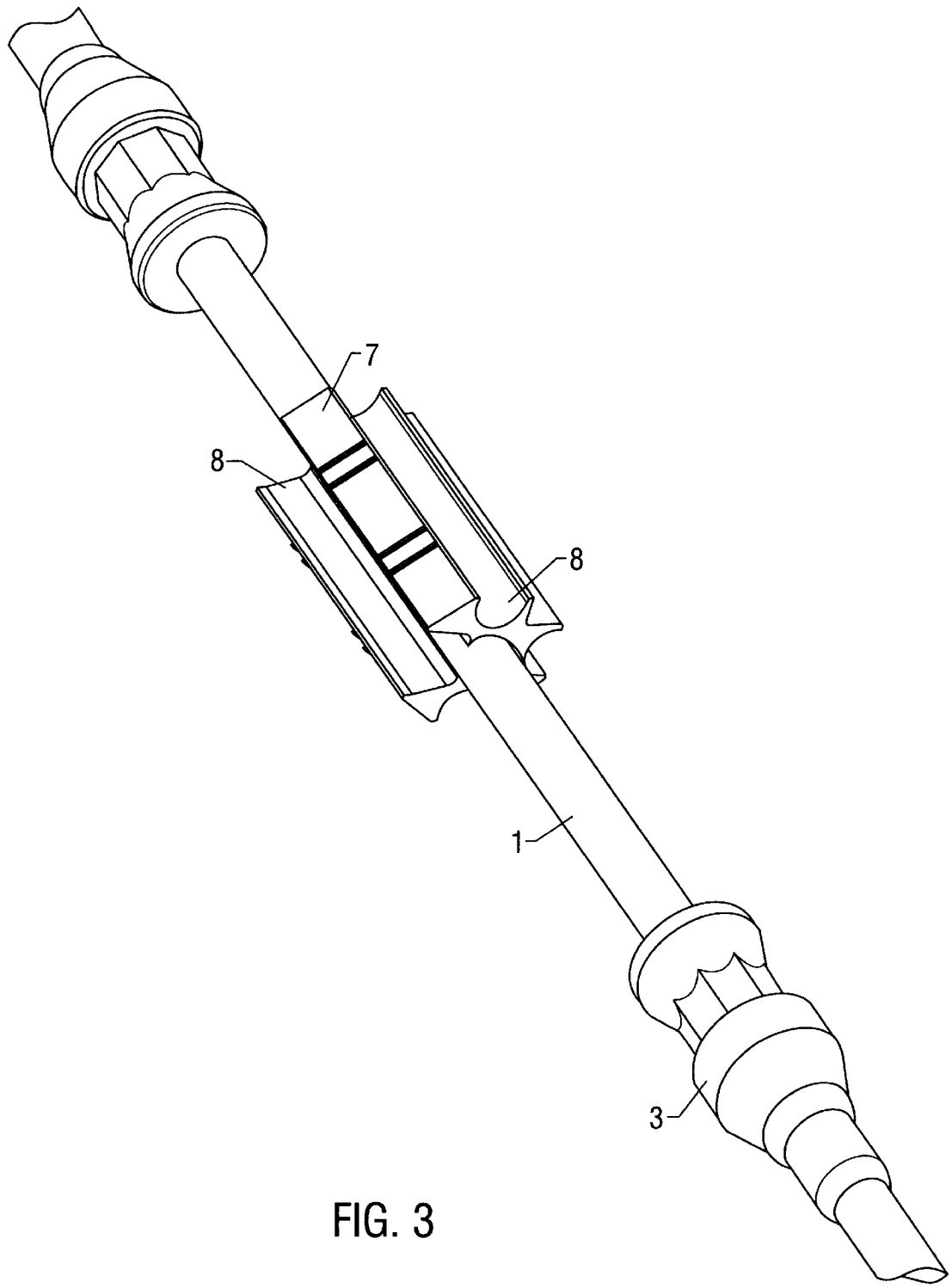
FIG. 3 illustrates an organizer attached about the seismic cable.

FIG. 3 illustrates organizer 7 coaxially aligned with and attached about cable 1. In one embodiment, the organizer includes an internal bore which is adapted to fit snugly about cable 1. Because of its flexible nature, the organizer may be snapped onto cable 1 via longitudinal slot 30 which extends the length of the organizer. The organizer has a plurality of grooves 8 extending circumferentially about the internal bore for holding and orienting the sensor package, balance rods, and any additional weights, sensors, or connector packages and their associated balancing masses. Sensing instruments such as depth gauges, compasses, temperature gauges, salinity measuring devices and other oceanographic sensing devices may be mounted in the organizer. Preferably, the organizer is made of a pliable plastic whereby the various pieces are held snuggly in the external grooves 8. The pieces may also be secured to the organizer by well known items such as banding straps or plastic tie wraps, or the like. As indicated above, each piece in the organizer is substantially balanced by one or more offsetting masses radially opposite the cylindrical axis of the cable.

Figure 4:
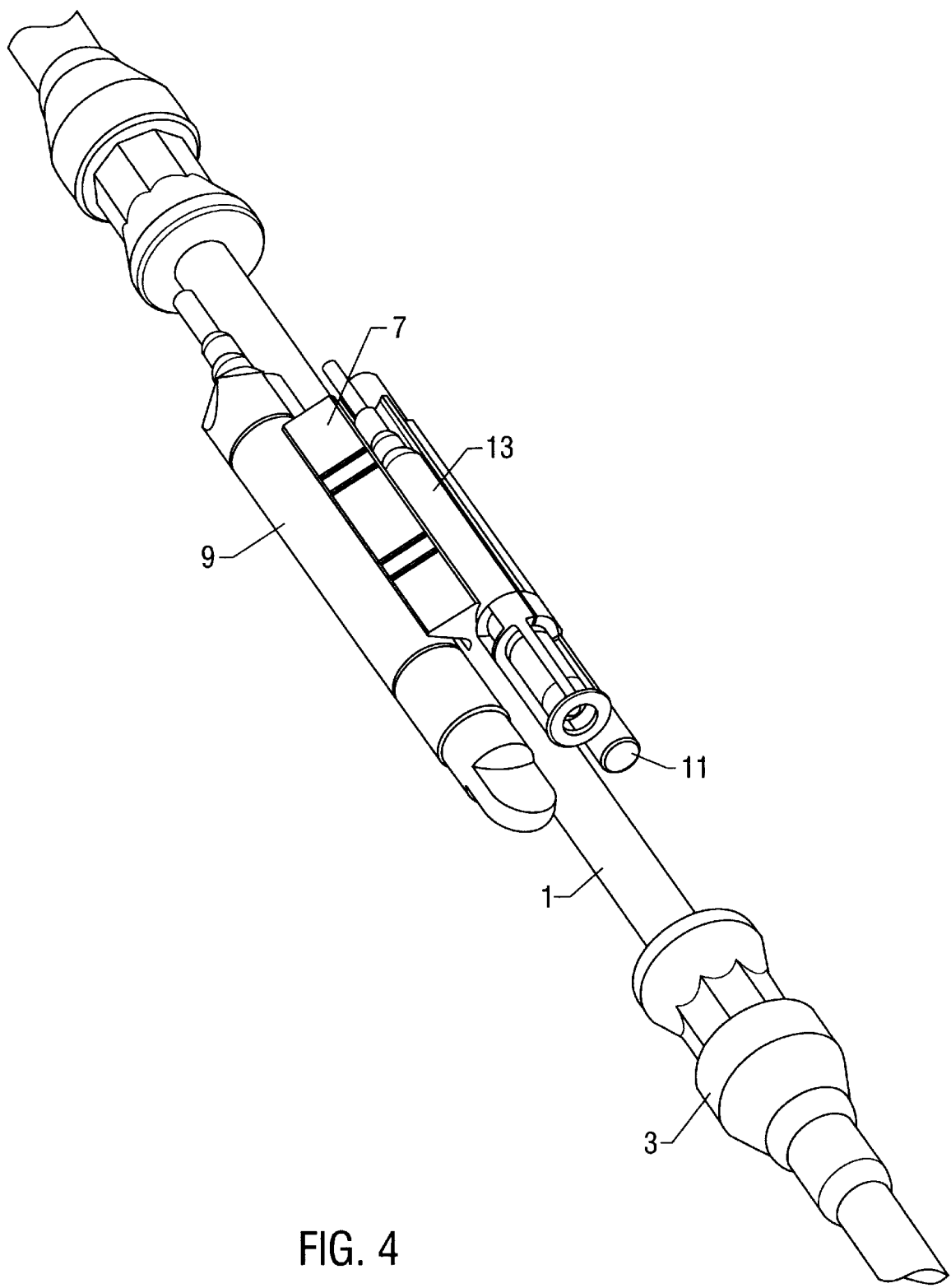
FIG. 4 illustrates one embodiment of the invention in which the organizer is shown holding a four component seismic sensor module, the four component sensor's balance rod and a pinger (Note: The pinger balance rod would be mounted behind the host cable opposite the pinger, but is not shown in the interest of drawing clarity.)
Figure 5:
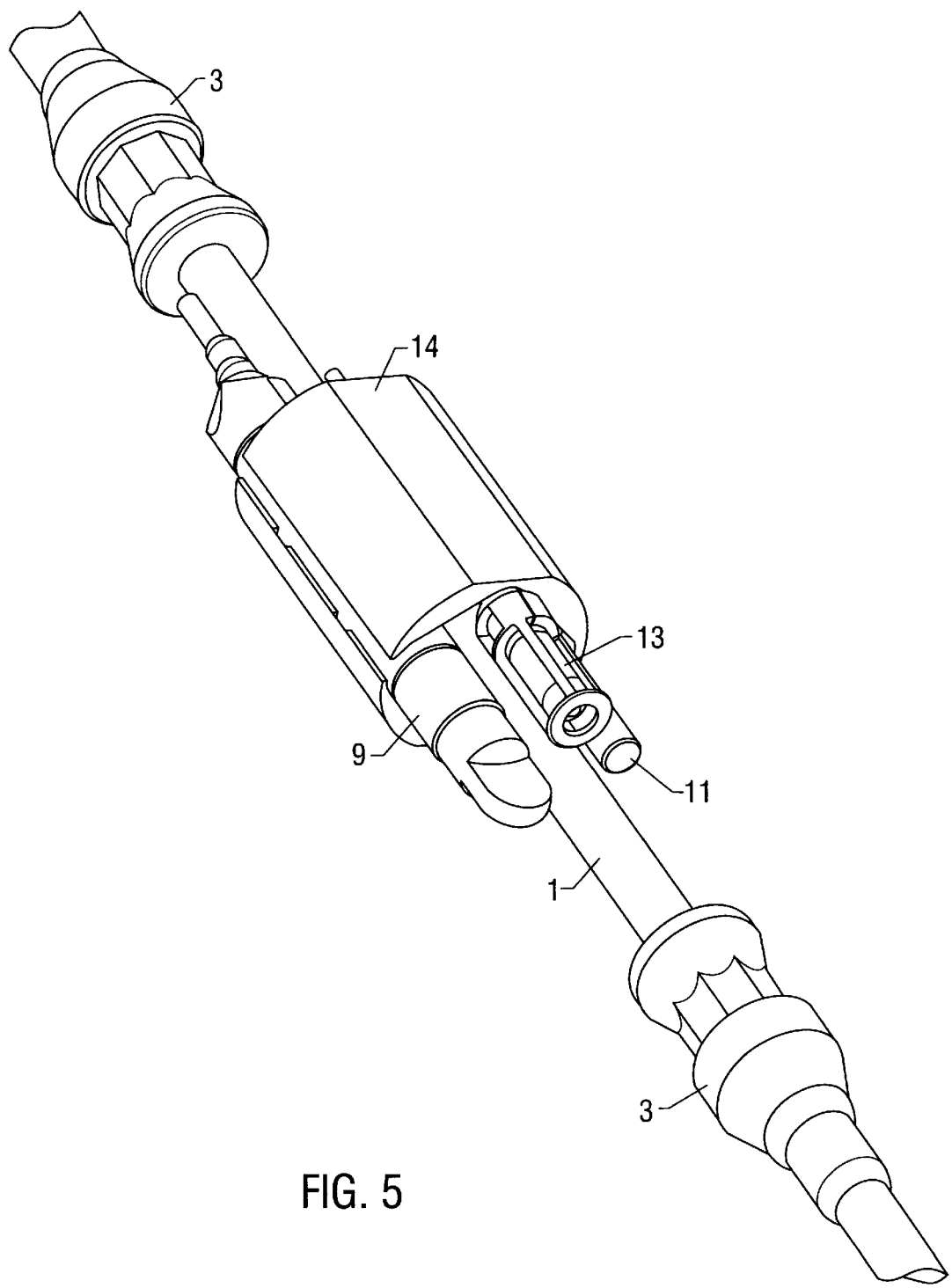
FIG. 5 illustrates the organizer clamp secured about the organizer, seismic sensor, balance rod and pinger.

As shown in FIG. 4, a four component seismic sensor 9 is inserted into an external groove in organizer 7. The four component seismic sensor is well known in the art and includes three geophones, one for the vertical axis and two for the horizontal axis, and one hydrophone. Commercially available four component sensors, such as the 4C sensor manufactured by Mark Products, are well suited for use with the invention. Pinger 13 is optional and may be used to test the sensors and help locate sensors when conducting ocean bottom seismic measurements. The organizer may hold one or more balance rods 11 (the balance rod for pinger 13 is omitted in FIGS. 4 and 5, for clarity). The balance rods are used to balance the seismic sensor shroud package to substantially eliminate torsional imbalance. The balance rods are preferably located radially opposite the cylindrical axis of the cable of the mass it is designed to counterbalance. The mass of each balance rod will typically be determined by the mass of the object radially opposite each rod. One of skill in the art will recognize that torsional balance is achieved when the combined moment arm and mass cross product of the components held on one half of the organizer is substantially equal to the combined moment arm and mass cross product of the components held on the other half of the organizer. How well the seismic sensor shroud package lays on the ocean bottom (i.e., couples to the ocean bottom) effects the quality of the seismic data measured. Alternatively, the shape, size and mass of the organizer may be designed to offset the mass moment arm created by the seismic sensor so that the combined mass moment arm of the assembly is substantially balanced.

After all components or pieces have been placed in the organizer, an organizer clamp 14 (shown in FIG. 5) is fitted around the components and secured together to form a solid piece to enhance the coupling ability of the seismic sensor shroud package. Clamp 14 preferably fills substantially all of the voids between the components and the outer shell so all vibrations are transmitted to the seismic sensors. The clamp may be taped together or bound by banding straps or plastic tie wraps, or the like. The clamp prevents air or water pockets from forming around the sensors which could act as shock absorbers and effect the accuracy of the measurements.

Figure 6:
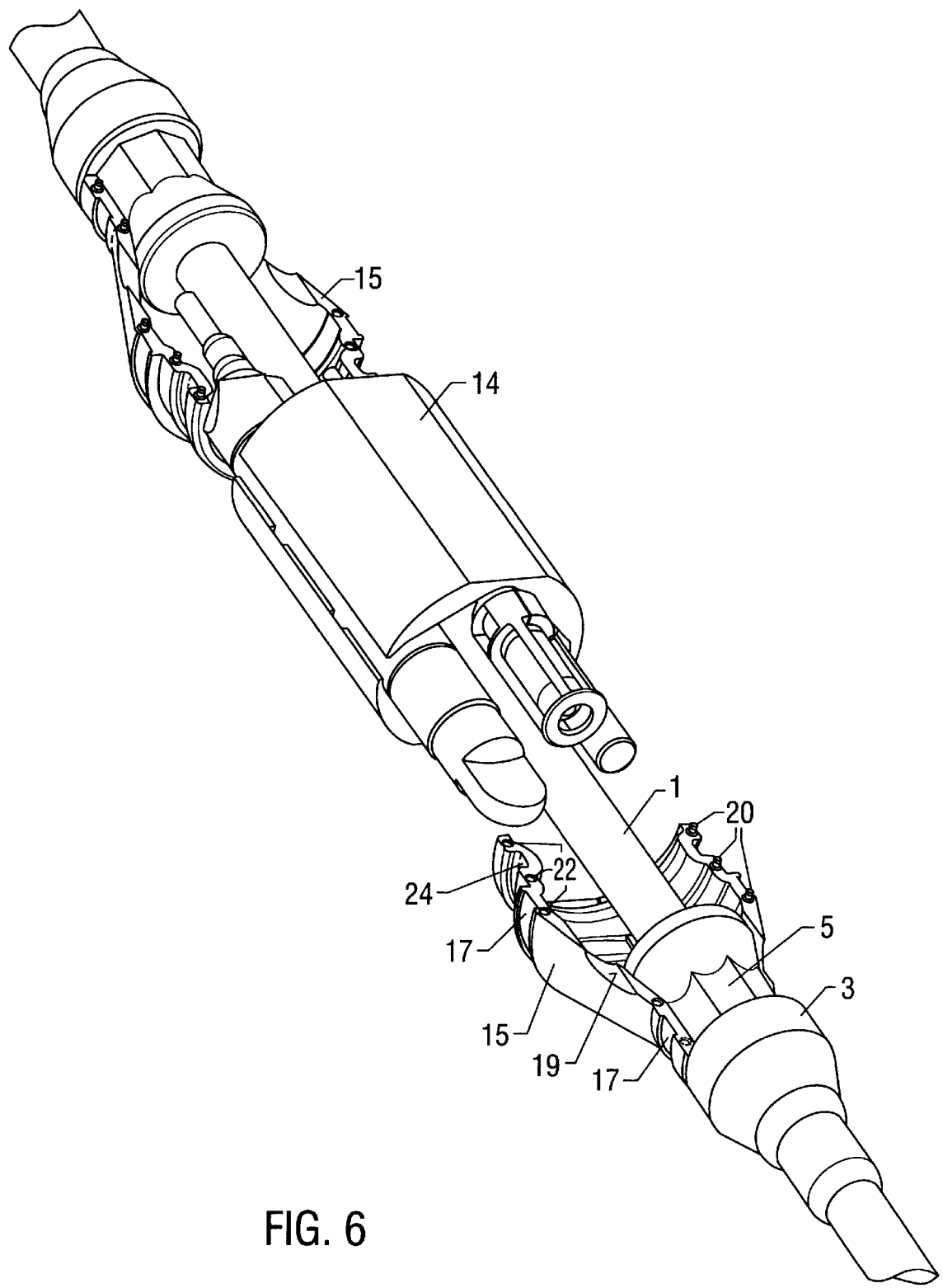
FIG. 6 illustrates a half section of the end spacers attached about the overmold endshot anchors.
Figure 7:
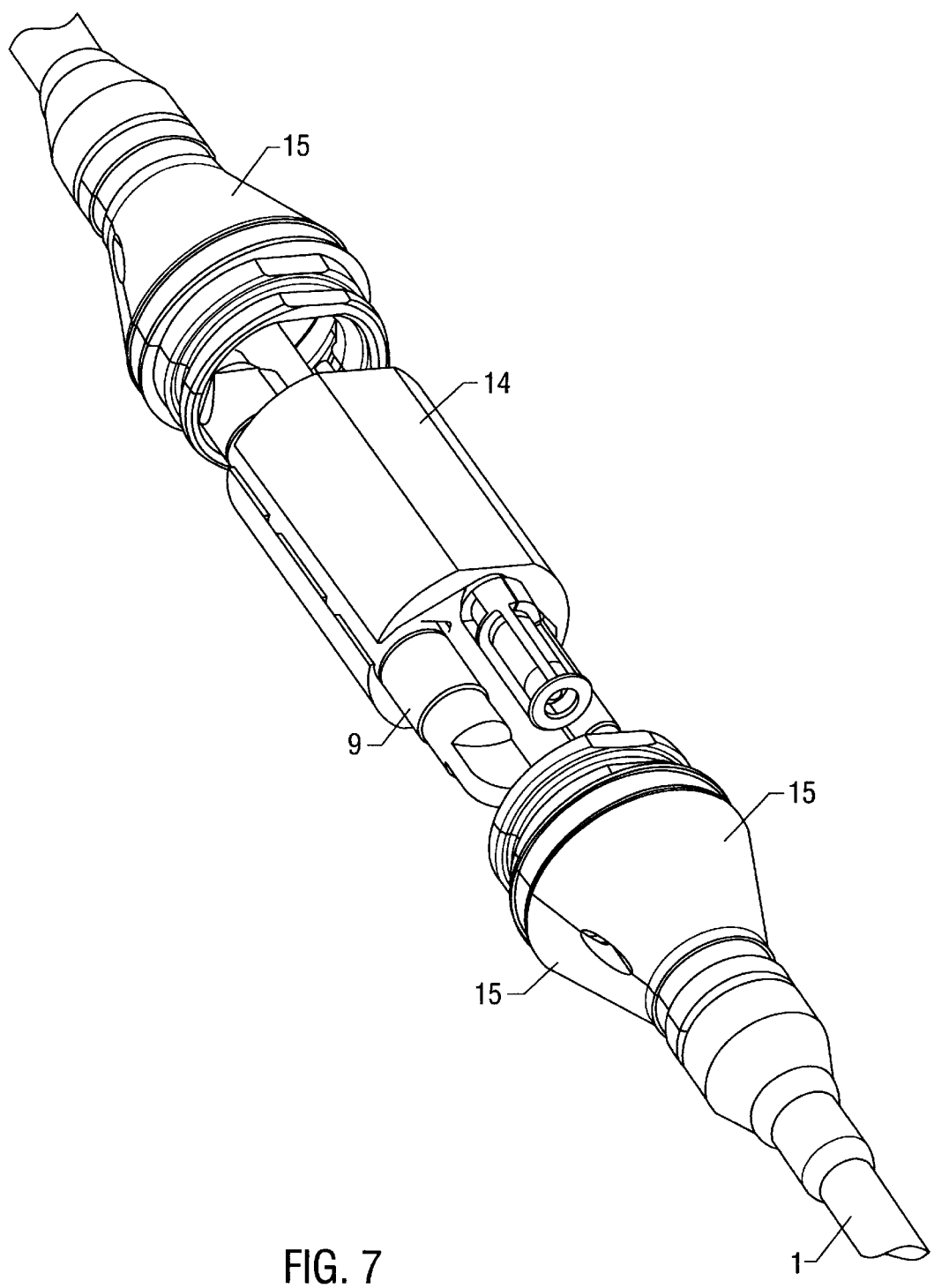
FIG. 7 illustrates both halves of the end spacers attached about the endshot anchors.

In a preferred embodiment, a tapered end piece is attached about each overmold endshot anchor. As shown in FIGS. 6 and 7, end pieces 15 include a tapered neck which fits the contour of flat surfaces 5 on anchors 3 and extends to substantially the external diameter of the assembled shroud. Flat surfaces 5 prevent end pieces 15 from rotating relative to anchors 3. In a preferred embodiment, two halves of a tapered end piece 15 are hermaphroditic and have mating surfaces which fit together using a circular mortise and tenon arrangement. A plurality of tenons 20 and mortises 22 on one half of an end piece will align with and connect to corresponding mortises and tenons on the other half of the end piece. The end piece may be snapped together about an endshot anchor and further secured by a plurality of banding straps which may be located in grooves 17 placed about the external diameter of the end piece 15. In a preferred embodiment, stainless steel bands are located in groove 17 for affixing the two halves of an end piece together. The end pieces may also include wire holes 19 for an external takeout for splicing the wires from the cable with the sensor wiring. Holes 19 may also be used as an air bleed hole to release air trapped within the shroud.

Figure 8:
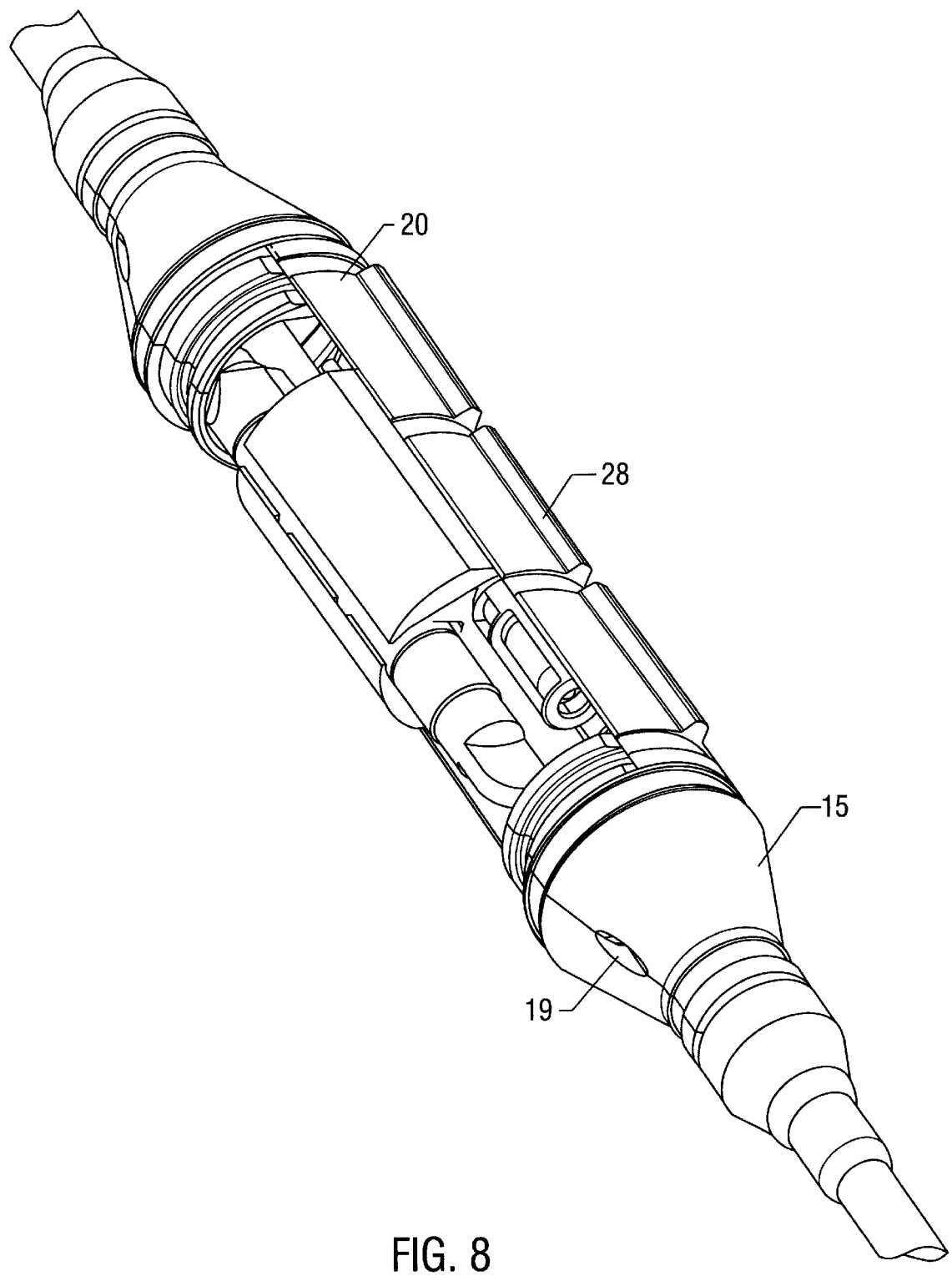
FIG. 8 illustrates a piece of the outer shell coupled to the end pieces.
Figure 9:
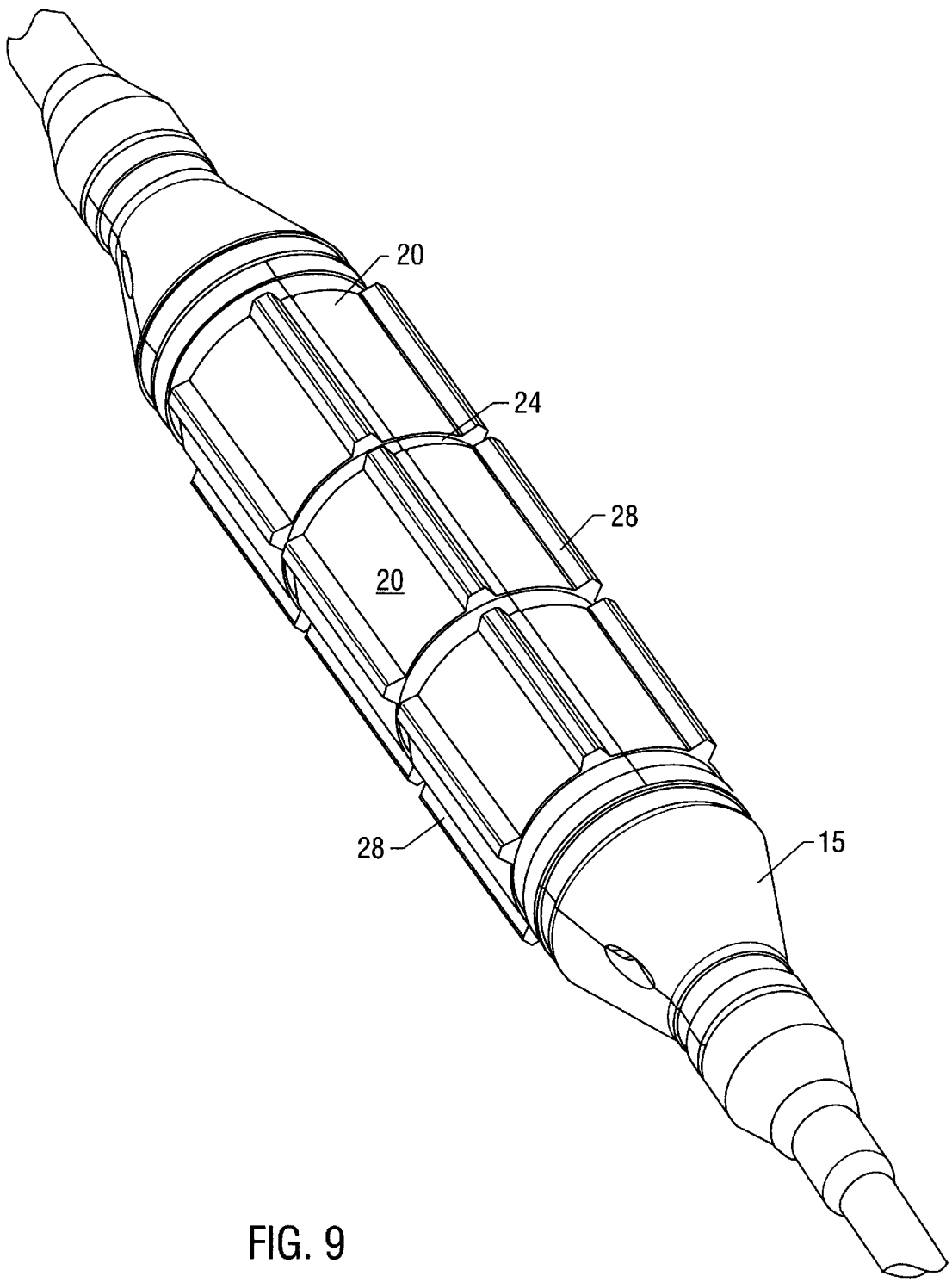
FIG. 9 illustrates an embodiment of the invention with the outer shell coupled to the end pieces, wherein the outer shell includes illustrative ribs.
Figure 10:
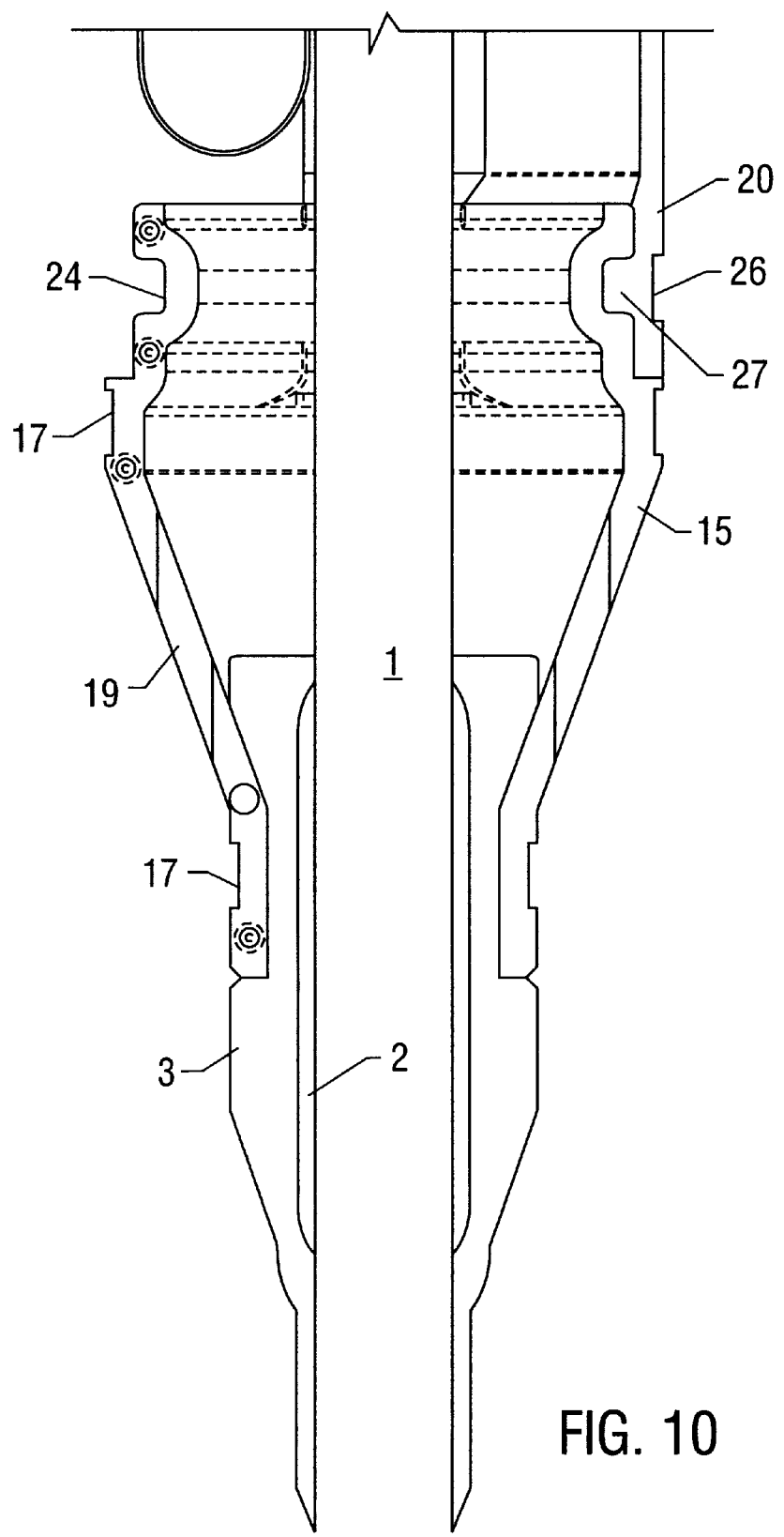
FIG. 10 is a cross sectional view of one end of the sensor housing shroud package.
Figure 11:
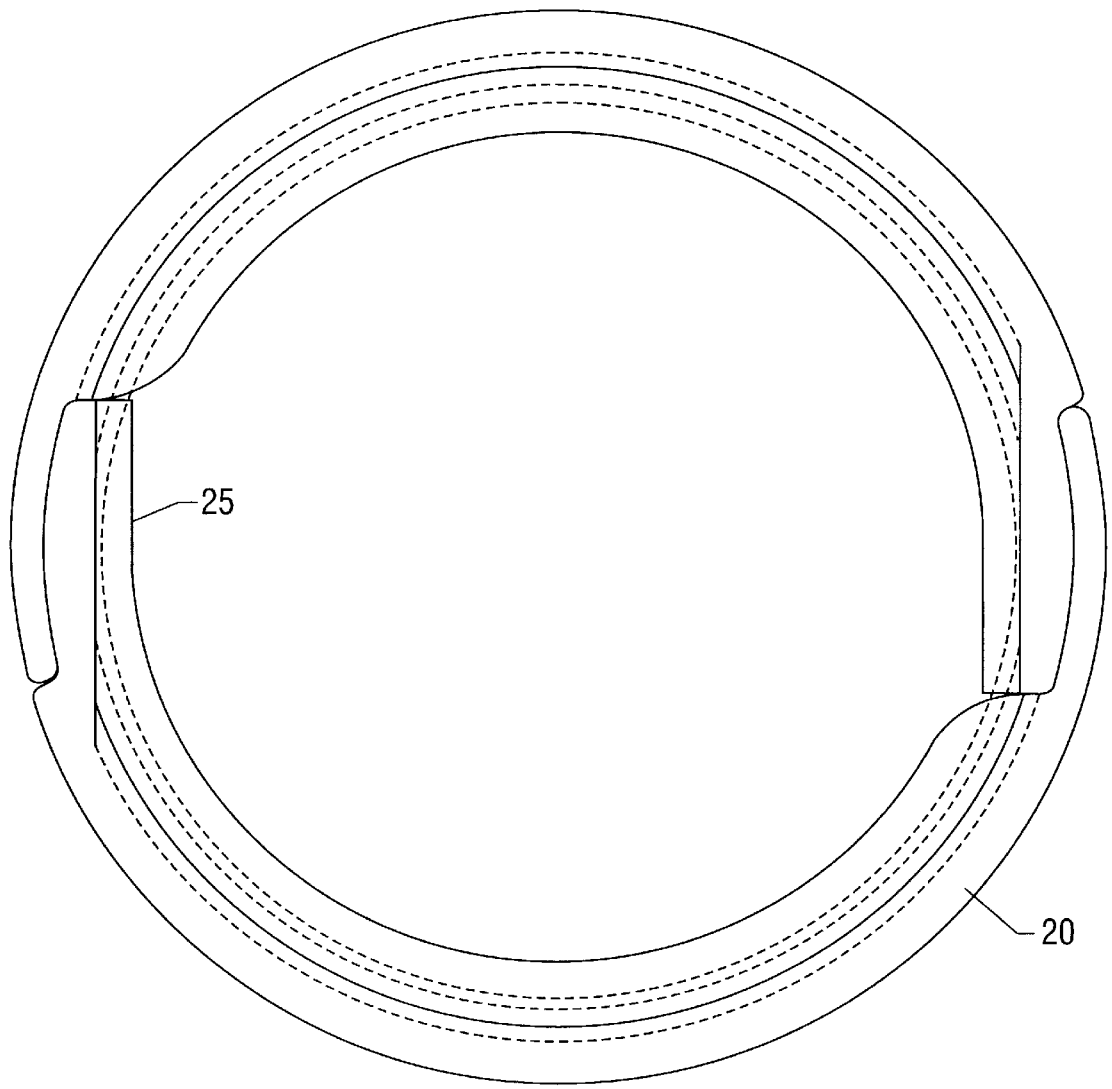
FIG. 11 illustrates a cross sectional view of the outer shell.

A substantially cylindrically symmetrical outer shell 20 is coupled to the end pieces to enclose the sensor package. The outer shell is preferably hermaphroditic. The ends of the outer shell may include an internal profile 27 which mates with an external groove 24 on the outer diameter of end pieces 15. The outer shell halves may also be coupled together by using a circular tenon and mortise arrangement, and further secured together with simple banding straps located in external grooves 26. Preferably, outer shell 20 may be easily removed to provide access to components, thus making the shroud package field serviceable for repairs. Preferably, the split for the halves of outer shell 20 is rotated 90 degrees from the split for the halves of end pieces 15, as shown in FIG. 8, for maximum strength. The shell may include a plurality of protrusions 28, as long as the protrusions are substantially mass moment-arm balanced. Outer shell 20 also includes internal flat surfaces 25 which align shell 20 with the flat surfaces on the external diameter of the organizer clamp. Flat surfaces 25 prevent shell 20 from rotating relative to the clamp, organizer, sensors, and cable.

Although only the endshot anchor cores and overmold endshot anchors need to be of the same material as the cable jacket for bonding, in a preferred embodiment the organizer, clamp, end pieces and shell are made out of the same plastic material. Preferably, polyurethane is used for these components. Polyurethane is flexible and heavier than water which helps nestle the shroud package to the ground for better coupling. The outer components of the shroud package such as the outer shell 20 and end pieces 15 may be made of harder polyurethane for strength and rigidity. However, even the harder polyurethane provide sufficient flexibility to withstand the bending forces associated with retrieving the cable from the ocean bottom.

Each of the end-anchors in a preferred embodiment is molded in two shots. Using two shots limits the heat transfer, with its potential for damage, into the host cable's core. The heat transfer from a large, thick-walled, single shot could be problematic because the thick walls would take so long to cool. The wall of the first shot (anchor core 2) is thin enough that it will cool quickly enough (through the walls of the mold), that it will not have time while at an elevated temperature to transmit enough heat through the host cable's jacket in to the host cable's core to cause damage. That is, the thermal mass of the material in the anchor core mold does not have enough total energy to damage the cable before it can be cooled enough to be safe. The first overmold then acts as a thermal insulator for the cable, isolating it from the next (heavier) overmold (i.e., endshot anchor 3). The two shots allow use of much smaller (and therefore less expensive) molding machines. This becomes more important when cables are being repaired on shipboard, where room is at a premium, than it is in the original manufacturing (factory) setting.

Operationally, the position of the overall assembly is first located on the host cable, and the end-anchor and takeout areas are marked. The takeout is often constructed first for ease of manufacturing, and follows conventional techniques. Then, when appropriate within the manufacturing schedule, the anchor molds are shot into place.

First, the area for the anchor cores 2 is prepped, so that when the anchor cores are molded they will properly adhere or bond to the host cable jacket. Prepping the surface of a polyurethane-jacketed cable or a polyurethane part for overmolding with polyurethane typically will involve mechanical abrasion to remove oxides or solvent resistant contaminants (such as one of the dimethyl silicons), followed by a chemical wash with a solvent (such as THF) or a cleaner (such as methanol) and a solvent, to yield an essentially virgin surface free of contamination that might inhibit a proper chemical bonding between the overmold anchor core and the host cable. The molding is done at high temperatures and pressures, and the anchor core becomes chemically bonded to the host cable jacket. The location of the second anchor core on the host cable in relation to the first anchor core is determined by the length of the final assembled shroud package. These anchor cores are allowed to cool before proceeding to the next overmold.

Depending on the length of time (and any resultant environmental contamination) the anchor cores have experienced since they were molded, they may go directly to the next overmold, or might be simply solvent washed, or will be completely prepped before molding. Once ready, each anchor core is then positioned within an endshot anchor mold and overmolded. The relatively thicker endshot anchors 3 will melt the surface of and adhere to the anchor cores 2 during the second molding process to create a monolithic structure. In a typical factory setting, the internal and external molds would be done on separate machines to speed the process and minimize cable handling. However, it is possible to use only one machine and change out the molds if only one machine is available, or if a limited number of such shots are required. The position, both longitudinally and rotationally, of the endshot anchors relative to each other is critical and is facilitated by using mating parts for the endshot anchor as a holding fixture. More particularly, the first overmold end shot anchor 3 is molded to one of the endshot cores 2. This first endshot anchor is removed from the mold and is placed in a holding fixture, in this case end piece 15, which locates the first endshot anchor longitudinally and rotationally, vis-a-vis flat surfaces 5, on the cable relative to the location for the second endshot anchor. The second endshot anchor is then molded to the second endshot core 2. By using an end piece 15 as a fixture to hold the first endshot anchor, flat surfaces 5 on the first and second endshot anchors will be properly aligned with each other.

Note that the end-anchors are directional and are facing in opposite directions. Unless there is sufficient manufacturing volume to make it economically feasible to have a dedicated molding machine and mold for each step, the direction of the cable must be reversed between molding the two anchors. Because of the size of the molding machines, this is typically accomplished by moving the cable, not the molding machines.

Although it is preferable for the reason stated above to have each of the end-anchors molded in two shots, using an endshot anchor core and an overmold endshot anchor, one of skill in the art will recognize that it is possible to mold each of the end-shot anchors in a single shot without departing from the spirit of the invention. In this alternative embodiment, endshot anchor 3 is molded directly to the seismic cable 1 without the use of an anchor core. The internal diameter of endshot anchor 3 in this alternative embodiment will be substantially the same as the external diameter of cable 1. The size and shape of the end anchors would have to be modified to ensure that the host cable's core is not damaged during the molding process or subsequent cool down period. Corresponding modification would have to be made to the portion of end pieces 15 which attach about the end anchors.

While the present invention has been particularly shown and described with reference to various illustrative embodiments thereof, it will be understood by those skilled in the art that various changes in form and details may be made without departing from the spirit and scope of the invention. The above-described embodiments are illustrative and should not be considered as limiting the scope of the present invention.

What is claimed is:

1. A sensor housing shroud for mounting seismic sensors to a cable comprising:

a pair of spaced apart endshot anchor cores bonded to the jacket of the cable;

an overmold endshot anchor bonded to each anchor core;

an organizer coaxially aligned with and attached about the cable for holding the seismic sensors;

an end piece attached about each overmold endshot anchor;

a substantially cylindrically symmetrical outer shell enclosing the organizer and coupled to the end pieces;

wherein the housing shroud has a substantially balanced rotational moment..

2. The sensor housing shroud of claim 1 wherein the organizer is adapted to hold balance rods, pingers and/or additional oceanographic sensing instruments and their associated balancing masses.

3. The sensor housing shroud of claim 1 wherein the end pieces are attached to flat surfaces on the respective overmold endshot anchors to prevent relative rotation between the end pieces and the anchors.

4. The sensor housing shroud of claim 1 further comprising an organizer clamp for securing components to the organizer.

5. The sensor housing shroud of claim 1 wherein the anchor cores and anchors are made of same plastic material as the cable jacket and are chemically bonded together to form a monolithic structure.

6. The sensor housing shroud of claim 5 wherein the anchor cores and anchors are made of polyurethane.

7. The sensor housing shroud of claim 1 wherein the shell is constructed of removable pieces held together by one or more banding straps.

8. The sensor housing shroud of claim 1 wherein the shell is composed of hermaphroditic pieces.

9. The sensor housing shroud of claim 1 wherein each mass held in the organizer is substantially balanced by an offsetting mass radially opposite the cylindrical axis of the cable.

10. The sensor housing shroud of claim 1 wherein the centerline of the shroud is substantially the same as the centerline of the cable.

11. The sensor housing shroud of claim 1 wherein the seismic sensors comprise a combination of gimbal mounted velocity sensors, oriented to one or more of the three axes.

12. The sensor housing shroud of claim 11 wherein the seismic sensors further comprise one or more pressure sensors.

13. A seismic sensor shroud package having a substantially balanced rotational moment comprising:
   a pair of spaced apart endshot anchor cores bonded to the jacket of a seismic cable;
   an overmold endshot anchor bonded to each anchor core;
   an end piece attached about each overmold endshot anchor;
   a four component seismic sensor attached to an organizer, the organizer being coaxially aligned with and attached about the cable; and
   a substantially cylindrically symmetrical outer shell coupled to the end pieces and enclosing the sensor,
   wherein the cylindrical axis of the package is coaxial to the axis of the cable.

14. The seismic sensor shroud package of claim 13 wherein the organizer is adapted to hold balance rods, pingers and/or additional oceanographic sensing instruments and their associated balancing masses.

15. The seismic sensor shroud package of claim 13 wherein the seismic sensors comprise a combination of gimbal mounted velocity sensors, oriented to one or more of the three axes.

16. The seismic sensor shroud package of claim 15 wherein the seismic sensors further comprise one or more pressure sensors.

17. The seismic sensor shroud package of claim 13 wherein the end pieces are attached to flat surfaces on the respective overmold endshot anchors to prevent relative rotation between the end pieces and the anchors.

18. The seismic sensor shroud package of claim 14 further comprising an organizer clamp for securing components to the organizer.

19. The seismic sensor shroud package of claim 13 wherein the anchor cores and anchors are made of the same plastic material as the cable jacket and are chemically bonded together to form a monolithic structure.

20. The seismic sensor shroud package of claim 13 wherein the shell is constructed of removable pieces held together by one or more banding straps.

21. The seismic sensor shroud package of claim 13 wherein the shell is composed of hermaphroditic pieces.

22. The seismic sensor shroud package of claim 1 wherein each mass held in the organizer is substantially balanced by an offsetting mass radially opposite the cylindrical axis of the cable.

23. A sensor housing shroud for mounting seismic sensors to a cable comprising:
   a pair of endshot anchors bonded to the cable;
   an organizer coaxially aligned with an attached about the cable for holding the seismic sensors located between the anchors;
   an end piece attached about each endshot anchor;
   a substantially cylindrical symmetrical outer shell enclosing the organizer and coupled to the end pieces;
   wherein the housing shroud has a substantially balanced rotational moment.

24. The sensor housing shroud of claim 23, wherein the organizer is adapted to hold balance rods and/or pingers.

25. The sensor housing shroud of claim 23, wherein the end pieces are attached to flat surfaces on the respective endshot anchors to prevent relative rotation between the end pieces and the anchors.

26. The sensor housing shroud of claim 23 further comprising and organizer clamp for securing components to the organizer.

27. The sensor housing shroud of claim 23 wherein the anchors are made of same plastic material as the cable jacket and are chemically bonded together to form a monolithic structure.

28. The sensor housing shroud of claim 27 wherein the anchors are made of polyurethane.

29. The sensor housing shroud of claim 23 wherein the shell is constructed of removable pieces held together by one or more banding straps.

30. The sensor housing shroud of claim 23 wherein the shell is composed of hermaphroditic pieces.

31. The sensor housing shroud of claim 23 wherein each mass held in the organizer is substantially balanced by an offsetting mass radially opposite the cylindrical axis of the cable.

32. The sensor housing shroud of claim 23 wherein the centerline of the shroud is substantially the same as the centerline of the cable.

* * * * *